US007547891B2

(12) United States Patent
Mordehai et al.

(10) Patent No.: US 7,547,891 B2
(45) Date of Patent: Jun. 16, 2009

(54) ION SAMPLING APPARATUSES IN FAST POLARITY-SWITCHING ION SOURCES

(75) Inventors: Alex Mordehai, Santa Clara, CA (US); Craig P. Love, San Jose, CA (US); Mark H. Werlich, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 301 days.

(21) Appl. No.: 11/676,249

(22) Filed: Feb. 16, 2007

(65) Prior Publication Data

US 2008/0197275 A1 Aug. 21, 2008

(51) Int. Cl.
*H01J 49/10* (2006.01)
*H01J 27/02* (2006.01)
*B01D 59/44* (2006.01)

(52) U.S. Cl. ................... 250/423 R; 250/424; 250/281; 250/282; 250/286; 250/293; 313/359.1

(58) Field of Classification Search ............. 250/423 R, 250/424, 281, 282, 286, 293; 313/359.1
See application file for complete search history.

(56) References Cited

U.S. PATENT DOCUMENTS

| | | | | |
|---|---|---|---|---|
| 4,542,293 | A | 9/1985 | Fenn et al. | |
| 4,977,320 | A | 12/1990 | Chowdhury et al. | |
| 5,736,740 | A | 4/1998 | Franzen | |
| 6,586,731 | B1 * | 7/2003 | Jolliffe | 250/288 |
| 7,081,618 | B2 | 7/2006 | Laprade | |
| 2008/0067408 | A1 * | 3/2008 | Winkler | 250/423 F |

* cited by examiner

*Primary Examiner*—Nikita Wells

(57) ABSTRACT

The present invention provides ion sampling apparatuses that can be used in a fast polarity-switching electric field. In some embodiments, the ion sampling apparatus comprises a capillary made with an insulator, with a resistive inner or outer surface. Devices and systems comprising the ion sampling apparatuses, as well as methods of use thereof, are also provided.

21 Claims, 7 Drawing Sheets

| Mode | Polarity | PWHH 301 UV 305 MS | PWHH 302 UV 306 MS | PWHH 303 UV 307 MS | PWHH 304 UV 308 MS |
|---|---|---|---|---|---|
| LC (UV) | N/A | 0.1909 | 0.1322 | 0.1251 | 0.1083 |
| MM-APCI | Positive | 0.1870 | 0.2006 | 0.1845 | 0.1747 |
| **% Broadening (MS)** | | **-2.04%** | **51.74%** | **47.48%** | **61.31%** |

| Mode | Polarity | PWHH 401 UV 405 MS | PWHH 402 UV 406 MS | PWHH 403 UV 407 MS | PWHH 404 UV 408 MS |
|---|---|---|---|---|---|
| LC (UV) | N/A | 0.1516 | 0.1724 | 0.1599 | 0.0753 |
| MM-APCI | Positive | 0.1715 | 0.2162 | 0.1645 | 0.0859 |
| **% Broadening (MS)** | | **13.13%** | **25.41%** | **2.88%** | **14.08%** |

ION SAMPLING APPARATUSES IN FAST POLARITY-SWITCHING ION SOURCES

BACKGROUND OF THE INVENTION

A mass spectrometer typically comprises an ion source, a mass analyzer, an ion detector and a data system. The ion source contains an ion generator which generates ions from a sample, the mass analyzer analyzes the mass/charge properties of the ions, the ion detector measures the abundances of the ions, and the data system processes and presents the data. In certain ion sources, an ion sampling apparatus is included as an interface to collect and transport ions from the ion generator to the mass analyzer. If both positively and negatively charged ions are produced in the ion source, the ion sampling apparatus needs to transport both kinds of ions. Since positive and negative ions may collide and lose their charges, the transport is usually achieved by switching the polarity of the ions that travel into the sampling apparatus so that only positive ions or negative ions are transported at the same time.

The new developments in liquid chromatography (LC) and ion generation sources have resulted in narrower chromatographic peaks (peak width often less than 2 seconds) and the possibility of identifying a vast variety of chemical compounds from an original sample in a single LC run. In order to identify all or nearly all components, it is important to generate and detect both positive and negative ions during the single LC run. Therefore, in more recent applications, the ion sampling apparatus not just maintains the ion transmission, but also needs to be able to switch the polarity of sampled ions quickly, preferably in less than 100 millisecond time intervals. At present, metal capillaries are used as ion transfer tubes (for example, see U.S. Pat. No. 4,977,320); however in this case the ion generator needs to be operated at high voltages, typically more than 1 kV. Even though these metal capillaries provide fast ion polarity-switching capabilities and are thus compatible with high resolution LC, the user safety issues involved in handling ion sources operated under high voltages make this configuration undesirable. Thus, an improved sampling apparatus is needed for fast polarity-switching ion sources.

Glass capillary sampling devices have been described (see, e.g., U.S. Pat. No. 4,542,293), utilizing non-conductive glass or fused silica material for ion transfer. However, it was discovered later that fused silica capillaries led to unstable ion transmission and dramatic sensitivity drops during continuing operation. Furthermore, these capillaries have only been operated with slow polarity-switching power supplies.

DESCRIPTION OF THE INVENTION

Figure 1A:
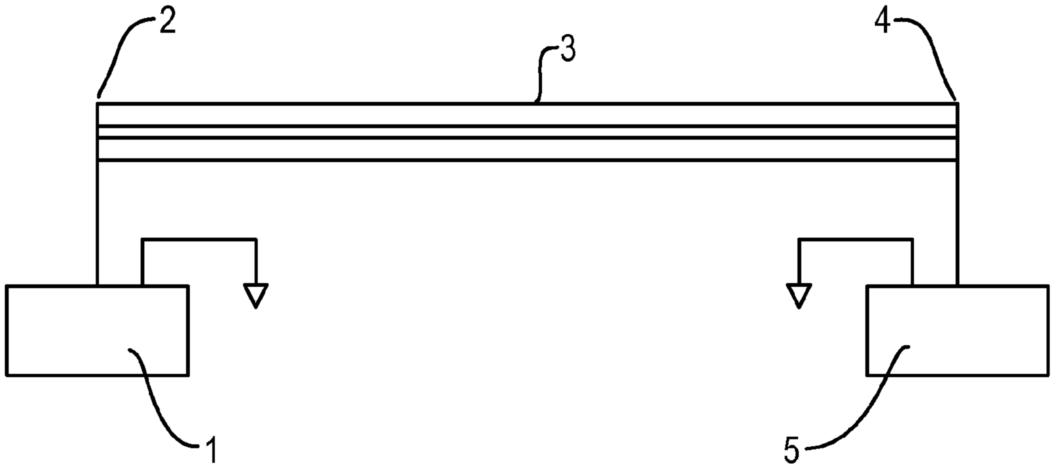
FIG. 1A is a diagram of some embodiments of the sampling apparatus of this invention, comprising a capillary and at least one power supply.

The present invention provides, inter alia, ion sources that are capable of fast polarity-switching and safer than the ion sources comprising metal capillary sampling devices. In some embodiments of this invention, the ion source comprises a capillary of an insulating or resistive material, with a resistive inner surface. The capillary is configured so that one end of it (designated the front end) can receive ions from the ion generator of the ion source. The ion source also comprises a power supply that applies a voltage potential to the front end of the capillary, wherein the polarity of the voltage potential alternates periodically to attract ions of the opposite polarity to the front end of the capillary. In some of the embodiments, the pressure at the front end of the capillary is higher than the pressure at its rear end.

The present invention also provides systems that comprise the ion sources described herein, as well as methods of using the ion sources and systems.

The details of one or more embodiments of the invention are set forth in the accompanying drawings and the description below. Other features, objects, and advantages of the invention will be apparent from the description and drawings, and from the claims.

Prior to describing the invention in further detail, the terms used in this application are defined as follows unless otherwise indicated.

Definition

It should be noted that, as used in the specification and the appended claims, the singular forms “a,” “an” and “the” include plural referents unless the context clearly dictates otherwise. Thus, for example, reference to “a mass analyzer” includes combinations of mass analyzers, and reference to “an ion source” includes combinations of ion sources, and the like.

The phrase “voltage potential alternates periodically” means that the voltage potential alternates repeatedly, at regular or irregular intervals. For example, the positive and negative sampling intervals may be equal (the time spent sampling positive ions and negative ions are equal); the positive and negative sampling intervals may be regular but not equal, such as 150 milliseconds for the positive sampling interval and 50 milliseconds for the negative sampling interval in each cycle. The sampling intervals may also vary. For example, a mass spectrometer can be programmed to change the course of sampling if a precursor ion is detected, etc.

The phrase "the voltage potential alternates at least two times per second" means that the polarity of the voltage potential is positive for at least one time (to attract negative ions), and negative for at least one time (to attract positive ions), per second. Similarly, "the voltage potential alternates at least three times per second" means that the polarity of the voltage potential switches in a manner to provide at least 1.5 positive ion scans and at least 1.5 negative ion scans per second (namely at least 3 positive and 3 negative scans per two seconds).

Ion Sampling Apparatuses, Systems and Methods

We tested a prior art glass capillary (resistance more than 500 GOhm) in mass spectrometer analyses for ion sampling and transport with a polarity-switching power supply at 3 kV. The results revealed a polarity-switching equilibration delay, which ranged from 300 milliseconds to 3 seconds, sometimes even longer. In other words, after the polarity of the power supply was switched, it took 300 to 3 seconds (or longer) before ion transmission reached the 90% level. Since the width of an LC peak is often less than 2 seconds, a polarity-switching equilibration delay of 300 to 3 seconds does not provide sufficient time resolution. To properly detect all or nearly all the components in a chromatographic peak, the positive ions and negative ions derived from the peak should be collected at least once each. However, to sufficiently define a peak, one would need at least 3 data points in each peak, preferably 6. Thus, within the duration of each peak, there must be time for collecting positive ions, polarity switch, collecting negative ions, and switching polarity again to repeat this process multiple times.

Originally this delay was attributed to capillary charging and slow charge dissipation after polarity-switching in the inner capillary bore due to the highly resistive nature of the glass material in this capillary (more than 500 GOhm). However, another experiment with both capillary ends at near ground potential and floated ion source, wherein the ion source switched polarity, does not confirm this theory. In this experiment, ion transmission equilibration time was much less than 0.5 second, suggesting that charging may not be the main contributing factor to the slow equilibration times. The exact mechanism for long ion transmission equilibration time with glass capillaries is still not fully understood, but possibly can be attributed to the sharp non linear electrical field gradient in the direction opposite to the viscous flow and potential ion stalling within sharp field gradient; also polarization effects in the capillary material may play a substantial role in the equilibration process. It is possible that during polarity-switching, it takes some time for ions to build space or surface charge inside the capillary to compensate for the strong electrical field gradient. It is also possible that it takes some time to fully re-polarize the glass material during switching.

Surprisingly, we discovered that a coating of resistive material on the interior surface of the glass capillary resulted in fast polarity switch. As described in Example 1, a mixture of four sulfanamide drugs (20 ng/μl each sulfamethizole, sulfamethazine, sulfachloropyridizine and sulfadimethoxine in a solvent of 97% water and 3% acetonitrile) was analyzed by LCMS with a power supply that switches polarity about 4 times a second at the sampling apparatus. Although the LC peaks were sharp (about 1.5 seconds each), the mass spectrometer detected both the positive ions and negative ions in each peak. In contrast, the prior art glass capillary yielded peaks that were split or uneven (tailing). Thus, the resistive interior surface dramatically improved the performance of the sampling apparatus in a fast polarity-switching electrical field. The results indicate that the resistive capillaries of the present invention with substantially uniform voltage gradient across total capillary length provide ion transmission equilibration time of, for example, less than 50 milliseconds, while allowing one to operate an ion source at near ground potential.

Also surprisingly, the resistive capillary of the present invention significantly reduced the problem of peak broadening. The width of a peak from a separating device (such as a liquid chromatography column) can be calculated based on the properties and running conditions of the separating device. However, the width actually detected after MS, by UV or other methods, is usually broader, and each additional step of detection broadens the peaks further. Surprisingly, in our experiments with resistive capillaries, the peaks were much sharper whether the power supply switches polarity or not (see Example 2 and FIGS. 4-7). The mechanism for this sharpening effect is unclear.

Thus, the present invention provides a sampling apparatus that can be used in a fast polarity-switching electric field. FIG. 1A shows one embodiment of the invention, wherein a power supply 1 is connected to the front end 2 of a capillary 3 with a resistive inner surface. Optionally, a second power supply 5 is connected to the rear end 4 of the capillary 3. The second power supply may be useful in the next step, such as mass analysis or fragmentation. In some embodiments, one power supply is connected to both ends of the capillary. The power supplies switch polarities periodically, for example, at least once every second, or at least 2, 3, 4, 5, 6, 7, 8, 9, 10, 11 or 12 times per second, or more frequently. In some embodiments, it is desirable to provide a substantially linear electrical field gradient which can be switched to the opposite polarity (preferably with a delay time of 50 milliseconds or less) for sampling ions of different polarities over the ion transport capillary 3. The sampling apparatus, comprising the capillary and at least one power supply, can be configured to receive ions from an ion generator in an ion source. The front end 2 of the capillary 3 is near an ion generator (not shown), and the rear end 4 is connected, directly or indirectly, to a mass analyzer. In some embodiments, the ion generator operates at a voltage potential of less than about 1000, 900, 800, 700, 600, 500, 400, 300, 200, 100, 75, 50, or 25 volts. In some embodiments, the ion generator is at ground potential.

Any resistive material can be used to cover the inner surface of the capillary. For example, we used a capillary that was made with lead enriched glass (MCP-10 or 6512 by Burle Industries) and thermally modified in an oven in the presence of hydrogen gas to achieve a final resistance of about 120 MOhm. This method of manufacture is described in U.S. Pat. No. 7,081,618. The use of resistive capillaries is also described in U.S. Pat. No. 5,736,740. It is recognized that other techniques or materials can be used to prepare the resistive capillary tubes with similar resistive properties. Examples of resistive materials include, without being limited to, resistive inks (carbon, cermet, polymer, etc.), metallic oxides, doped glasses, metal films, and ferrite compounds. However, the technique of achieving resistive capillaries through a metal oxide reduction process with a metal/metal oxide containing glass has an additional benefit: it provides a chemically inert resistive surface in the inner bore of the capillary without depositing an additional material. In addition, instead of an insulating capillary with a resistive inner surface, the capillary may be a completely resistive tube. Thus, the capillary may be made with a resistive material in its entirety, or it may comprise an inner surface of a resistive material that is different from the resistive material in the body of the tube. In any event, the outer surface of the capillary may also be optionally covered with a resistive material.

Furthermore, it is contemplated that a capillary (of any material but preferably insulating or resistive) with an outer resistive surface can be used in accordance with the present invention. The inner surface may or may not be resistive.

It is preferred to achieve a final resistance of more than about 10 MOhm for the capillary to minimize power consumption from the fast switching power supplies, and less than about 100 GOhm to provide fast field establishment and equilibration. The resistance is preferably about 100 MOhm to 50 GOhm, about 100 MOhm to 20 GOhm, or about 100 MOhm to 10 GOhm. Other preferred ranges of capillary resistivity include, without being limited to, about 750 to 1250, about 1000 to 1500, about 300-6000, about 300-2000, about 300-600, about 200-5000, about 200-2000, about 200-1000, about 200-800, about 200-600, about 200-400, about 100-1000, about 100-800, about 100-600, about 100-400, about 30-300, about 50-250, and about 75-125, all in MOhm. In some embodiments, the resistance is distributed substantially linearly along the capillary length to provide a substantially linear field gradient inside the inner capillary bore.

Figure 1B:
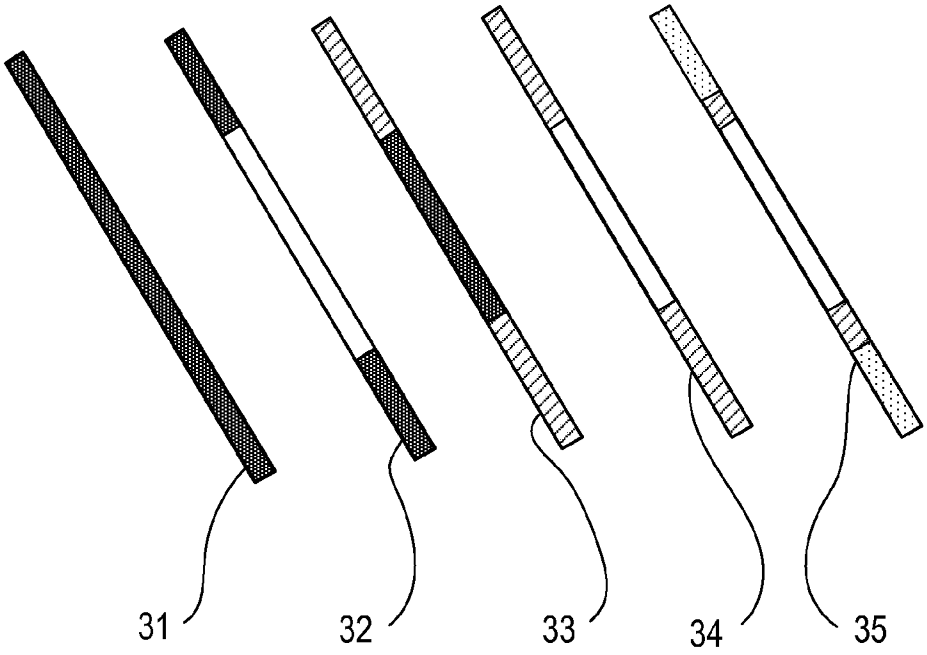
FIG. 1B shows some embodiments of the capillary.

The desired resistance can be achieved with ordinary skills in the art. For example, FIG. 1B shows some embodiments of the resistive capillary. All these capillaries are 180 mm in length, with an inner diameter of 0.6 mm and a resistive inner surface generated by the metal oxide reduction method described above. Capillary 31 has an outer resistive surface due to the metal oxide reduction process that rendered its inner surface resistive. The overall resistance of this capillary is 20 MOhm. The remaining four capillaries are modified from the first one. Thus, capillary 32 has been bead blasted in the middle part on the outer surface to remove the resistive material in this part, resulting in a resistance of 200 MOhm. Capillary 33 has a nickel chromium (NiCr) plating at both ends of the capillary, and its resistance is 160 MOhm. Capillary 34 contains both a bead blast center and NiCr plated ends, with a resistance of 3400 MOhm. Capillary 35 is similar to 34 but it has a gold plating covers the terminal ⅔ parts of the NiCr plating. The resistance of this capillary is 200 MOhm. Note that all these five capillaries were not made according to the same process parameters, so their resistance levels vary even without bead blasting or metal coating. All these capillaries, with the exception of 31, have been tested with a fast polarity-switching power supply, and they were all capable of transporting both positive and negative ions without substantial delay. The size and shape of the capillary can also vary according to knowledge available in the art.

Figure 2:
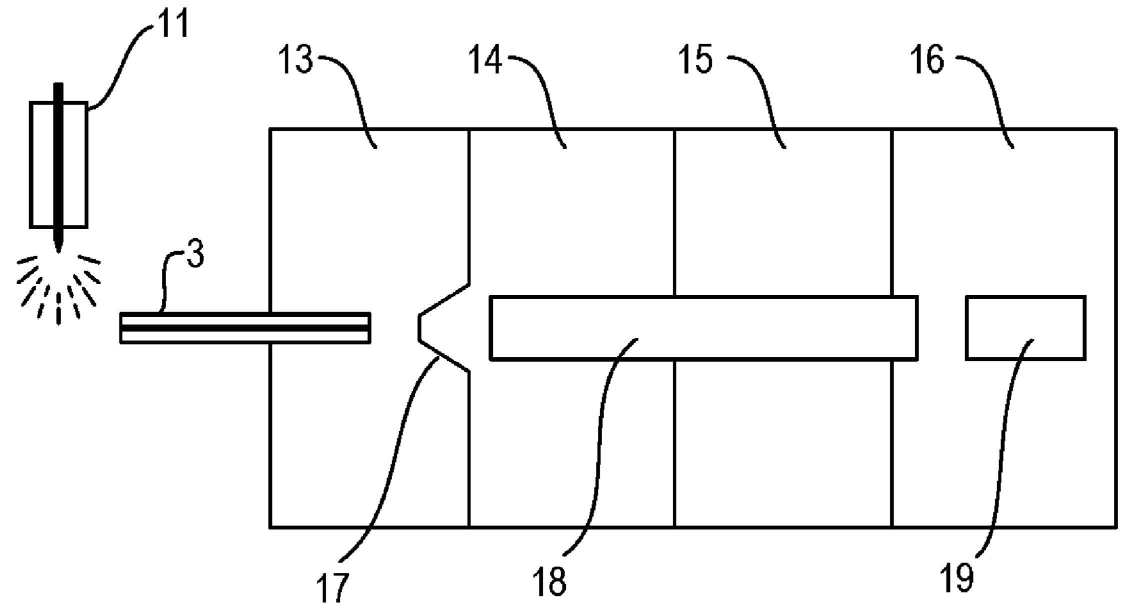
FIG. 2 shows an exemplary mass spectrometer according to some embodiments of the present invention.

In some embodiments, the pressure at the front end is greater than the pressure at the rear end. For example, the capillary is between an ion generator and a mass analyzer, and the ion generator operates at a pressure greater than that at the mass analyzer. These embodiments are particularly useful when the ion generator is an atmospheric pressure ion generator, and the mass analyzer operates near vacuum. FIG. 2 shows a general view of some embodiments of a mass spectrometer of the present invention, including atmospheric pressure ion generator 11, a capillary with a resistive inner surface 3, first vacuum chamber 13, second vacuum chamber 14, third and fourth vacuum chambers 15 and 16, ion skimmer 17, ion transfer optics 18, and a mass analyzer 19. Although not shown in this figure, at least one power supply provides a voltage potential to the front end of the capillary.

Figure 3:
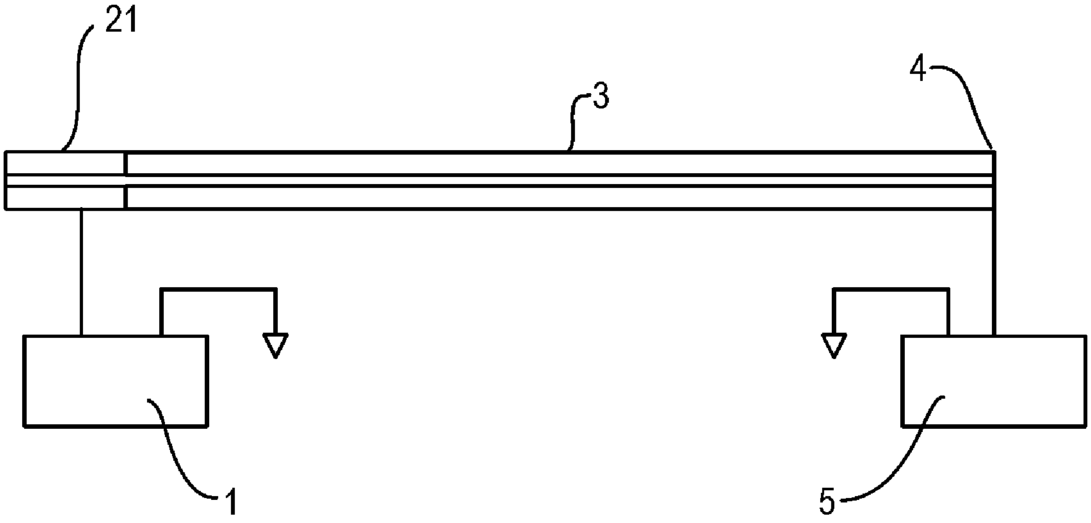
FIG. 3 shows another aspect of the sampling apparatus, wherein a nose piece is added to the capillary.

FIG. 3 depicts some embodiments of the present invention wherein an additional metal capillary 21 is concentrically aligned to the resistive capillary 3 to provide a continuing ion transport tube. The metal capillary 21 serves as a nose piece, or extender, and can be detachable from the resistive capillary 3. In this case it may be easily disconnected from the system for cleaning without breaking the vacuum. It is recognized that a different shape of the nose piece can be employed, and it is also recognized that a similar piece can be used at the capillary exit (not shown). Instead of metal, the nose piece may comprise the same material as the capillary (including the resistive inner surface). Optionally, there may be an adapter to connect the nose piece to the capillary, such as a ring outside the connection point to hold the two parts in place. The capillary may also be a combination of metal capillaries interlaced with the resistive capillary sections.

The capillary may be part of a system, such as a mass spectrometer system. The mass spectrometer system may comprise any ion generator, any mass analyzer, or any data system known in the art. The ion generator may be, for example, an electrospray (ES), chemical ionization (CI), matrix assisted laser desorption (MALDI), photoionization ion source, or any combination of ion generators. The mass analyzer may be, for example, a quadrupole, time-of-flight, ion trap, orbital trap, fourier transform-ion cyclotron resonance (FT-ICR), or combinations thereof. The mass spectrometer system may also be a tandem MS system, comprising more than one mass analyzer configured in tandem. For instance, the tandem MS system may be a "QQQ" system comprising, sequentially, a quadrupole mass filter, a quadrupole ion guide, and a quadrupole mass analyzer. The tandem MS system may also be a "Q-TOF" system that comprises a quadrupole and a time-of-flight mass analyzer. The mass spectrometer system may further comprise a gas chromatography column, a liquid chromatography column, and/or other sample separation or analysis devices.

The following examples are offered to illustrate this invention and are not to be construed in any way as limiting the scope of the present invention. While this invention is particularly shown and described with references to preferred embodiments thereof, it will be understood by those skilled in the art that various changes in form and details may be made therein without departing from the spirit and scope of the invention as defined by the appended claims.

EXAMPLES

In the examples below, the following abbreviations have the following meanings. Abbreviations not defined have their generally accepted meanings.

° C.=degree Celsius
hr=hour
min=minute
sec=second
M=molar
mM=millimolar
μM=micromolar
nM=nanomolar
ml=milliliter
μl=microliter
nl=nanoliter
mg=milligram
μg=microgram
kV=kilovolt
GOhm=gigaohm
MOhm=megaohm
Hz=hertz
HPLC=high performance liquid chromatography
LC=liquid chromatography
MS=mass spectrometer
LCMS=liquid chromatography/mass spectrometer MALDI=matrix assisted laser desorption ES=electrospray APCI=atmospheric pressure chemical ionization Example 1

Ion Sampling in a Fast Polarity-Switching Field

A 0.5 µl sample comprising four sulfanamide drugs (20 ng/µl each sulfamethizole, sulfamethazine, sulfachloropyridizine and sulfadimethoxine in a solvent of 97% water and 3% acetonitrile) was injected on a Zorbax SB-C18 2.1×30 mm LC column and eluted at 1.3 ml/min using a MeOH/H2O gradient. The column was connected to an MS system with an atmospheric pressure ES+APCI multimode ion source. The ion source was also equipped with a capillary made of a lead enriched glass (6512 by Burle Industries) that had been thermally modified in an oven in the presence of hydrogen gas. Some of the resistive material was removed from the outer portion of the capillary to achieve a final end-to-end resistance of about 3 GOhm. The ion source also contained a power supply that switched polarity about 4 times per second. The system was set to a delay time of 25 milliseconds between polarity switching and sample detection.

Figure 4:
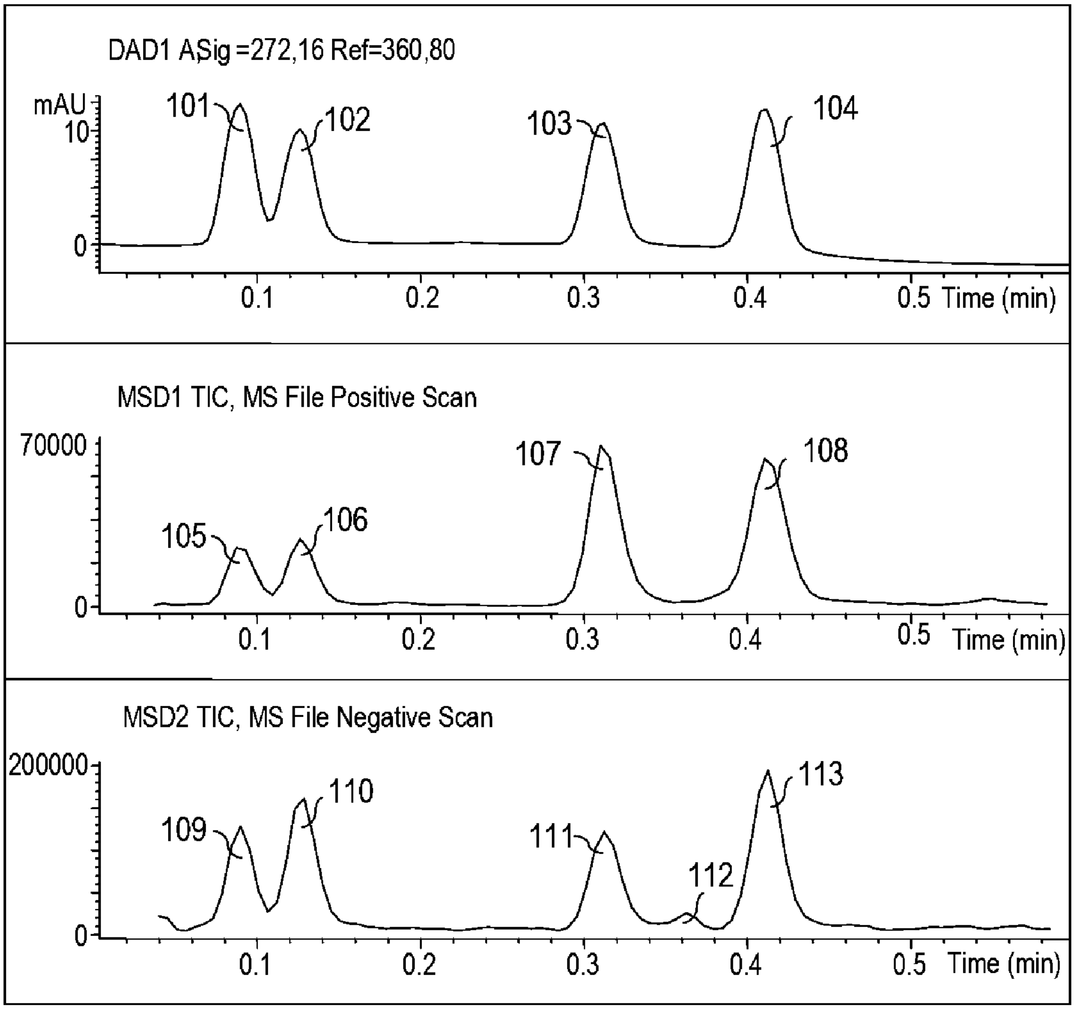
FIG. 4 shows the LC (UV) profile (upper panel), MS positive scan (middle panel) and MS negative scan (lower panel) of a sulfanamide drug sample (20 ng/μl each sulfamethizole, sulfamethazine, sulfachloropyridizine and sulfadimethoxine in a solvent of 97% water and 3% acetonitrile) analyzed by the method described in Example 1 herein with a fast polarity-switching power supply to generate both positive and negative ions. In this experiment, a capillary with a resistive inner surface and an end-to-end resistance of approximately 3 GOhm was used.

FIG. 4 shows the LC profile monitored by UV (upper panel) wherein the sulfanamide drugs were detected: sulfamethizole 101, sulfachloropyridizine 102, sulfamethazine 103, and sulfadimethoxine 104. The middle panel shows the MS positive scan wherein the positive ions were detected: sulfamethizole 105, sulfachloropyridizine 106, sulfamethazine 107, and sulfadimethoxine 108. The lower panel shows the MS negative scan wherein the negative ions were detected: sulfamethizole 109, sulfachloropyridizine 110, sulfamethazine 111, and sulfadimethoxine 113. An additional impurity peak 112 was also detected in the negative scan. Clearly, both positive ions and negative ions were detected without significant dropouts, if any. The results thus demonstrate that the ion sampling capillary sampled and transported ions in a fast polarity-switching field without any detectable polarity-switching equilibration delay beyond 25 milliseconds.

Figure 5:
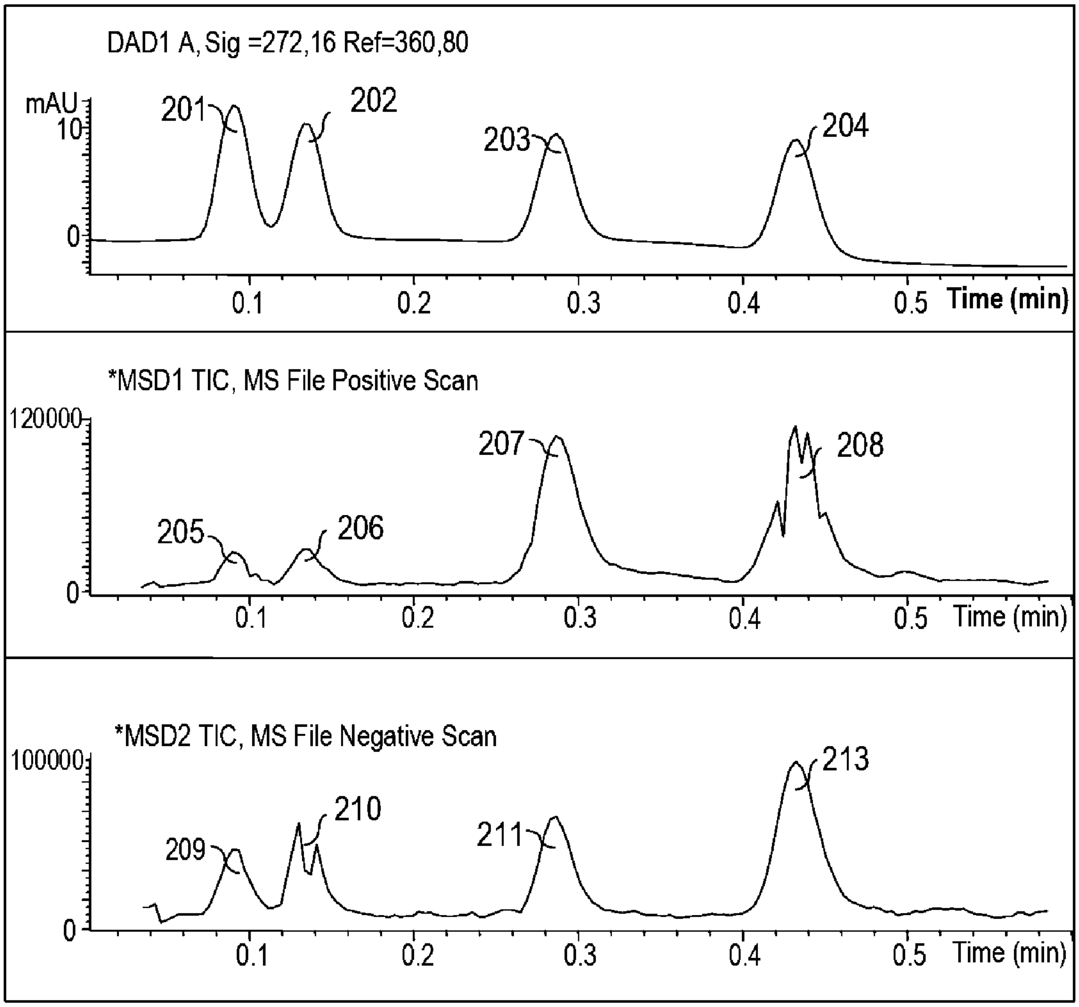
FIG. 5 shows the results of an experiment that was the same as that described in FIG. 4, except that a glass capillary with an end-to-end resistance greater than 500 GOhms was used.

The experiment described above was repeated using a prior art glass capillary (AOB, Branford, Mass.) with an end-to-end resistance greater than 500 GOhms. FIG. 5 shows the LC (UV) profile (upper panel) wherein the sulfanamide drugs were detected: sulfamethizole 201, sulfachloropyridizine 202, sulfamethazine 203, and sulfadimethoxine 204. The middle panel shows the MS positive scan wherein the positive ions were detected: sulfamethizole 205, sulfachloropyridizine 206, sulfamethazine 207, and sulfadimethoxine 208. The lower panel shows the MS negative scan wherein the negative ions were detected: sulfamethizole 209, sulfachloropyridizine 210, sulfamethazine 211, and sulfadimethoxine 213. There are several notable features in the MS data collected with the prior art glass capillary. In the MS positive scan of FIG. 5, the first two peaks (205 & 206) show lower response relative to peaks 207 and 208. Peak 208 in the MS positive scan and peak 210 in the MS negative scan also exhibit signal dropouts. These dropouts were not apparent with a longer switching delay (300 milliseconds; data not shown), indicating that the prior art glass capillaries take longer to establish stable ion transport through the capillary. In addition, while longer switching delays eliminated the signal dropout problems with the prior art capillaries, the result was significant peak broadening of the MS positive and negative scans versus the UV profile.

Example 2

Peak Sharpening in a Non-Switching Field

A 0.5 µl sample comprising four sulfanamide drugs (20 ng/µl each sulfamethizole, sulfamethazine, sulfachloropyridizine and sulfadimethoxine in a solvent of 97% water and 3% acetonitrile) was injected on a Zorbax SB-C18 2.1×30 mm LC column and eluted at 0.6 ml/min using a MeOH/H2O gradient. The column was connected to an MS system with an atmospheric pressure ES+APCI multimode ion source. The ion source was also equipped with either a prior art glass capillary with an end-to-end resistance greater than 500 GOhm, or a capillary made of a lead enriched glass (6512 by Burle Industries) that had been thermally modified in an oven in the presence of hydrogen gas to achieve a final end-to-end resistance of about 120 MOhm. The ion source contained a power supply that maintained a constant potential of −3000 V on the front end of the capillary. The ions source also contained a power supply that maintained a constant current of 4 µA on the corona needle for APCI operation.

Figure 6:
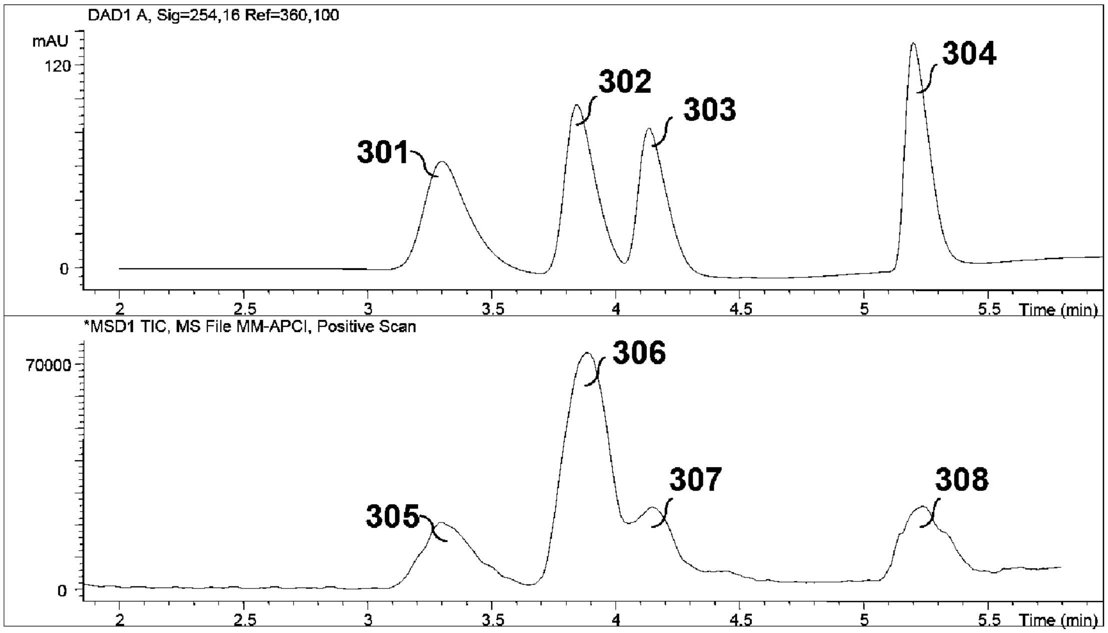
FIG. 6 shows the LC (UV) profile (upper panel) and MS positive scan (lower panel) of a sulfanamide drug sample (20 ng/μl each sulfamethizole, sulfamethazine, sulfachloropyridizine and sulfadimethoxine in a solvent of 97% water and 3% acetonitrile) analyzed by the method described in Example 2 herein with a non-switching power supply to generate positive ions. In this experiment, a prior art glass capillary with an end-to-end resistance greater than 500 GOhms was used. A table below the instrument profiles shows the relative peak broadening effect (MS peak widths versus the UV peak widths).

FIG. 6 shows the results of the experimental method described above using a prior art glass capillary. The top panel shows the LC profile monitored by UV wherein the sulfanamide drugs were detected: sulfamethizole 301, sulfachloropyridizine 302, sulfamethazine 303, and sulfadimethoxine 304. The lower panel shows the MS positive scan wherein the positive ions were detected: sulfamethizole 305, sulfachloropyridizine 306, sulfamethazine 307, and sulfadimethoxine 308. A table below the instrument profiles shows the peak width at half height (PWHH) of the UV and MS signals in minutes. In addition, the relative peak broadening of the MS profile vs. the UV profile is expressed as a percentage. While peak 305 of the MS profile had a narrower peak width due to a less-Gaussian (more triangular) peak shape, the other MS peaks exhibited significant peak broadening. The average peak broadening of all four MS peaks was 39.62%.

Figure 7:
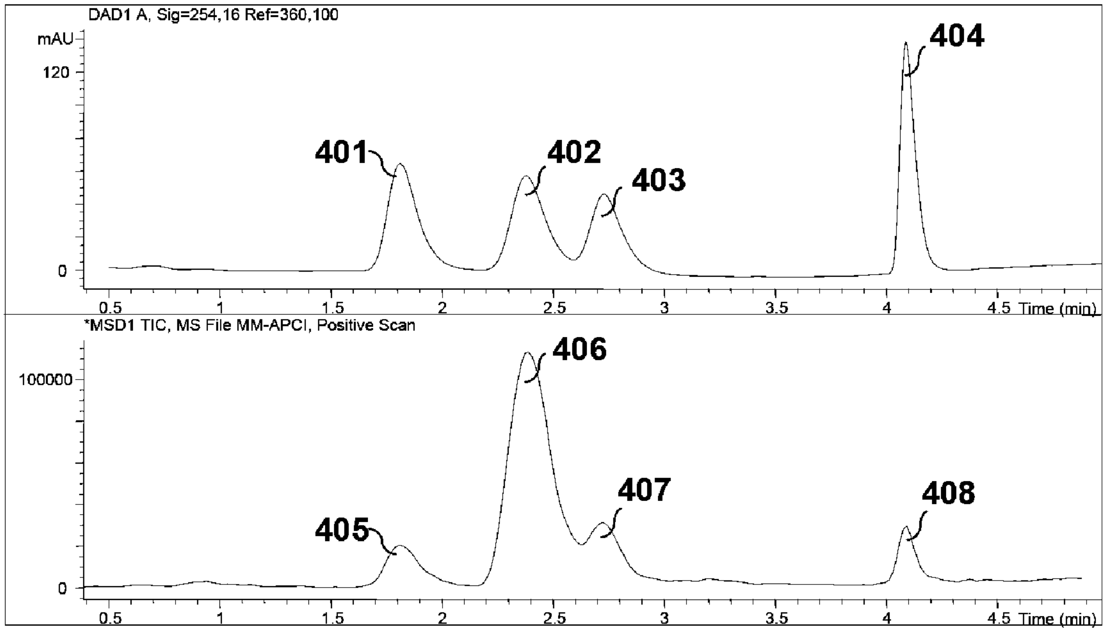
FIG. 7 is similar to FIG. 6, except that in this experiment, a capillary with a resistive inner and outer surface and an end-to-end resistance of 120 MOhm was used.

FIG. 7 shows the results of the experimental method described above using the lead enriched glass capillary with a resistive surface. The top panel shows the LC (UV) profile wherein the sulfanamide drugs were detected: sulfamethizole 401, sulfachloropyridizine 402, sulfamethazine 403, and sulfadimethoxine 404. The lower panel shows the MS positive scan wherein the positive ions were detected: sulfamethizole 405, sulfachloropyridizine 406, sulfamethazine 407, and sulfadimethoxine 408. A table below the instrument profiles shows the peak width at half height (PWHH) of the UV and MS signals in minutes. In addition, the relative peak broadening of the MS profile vs. the UV profile is expressed as a percentage. The MS peaks produced using a resistive capillary exhibited an average peak broadening of 13.88%, which represents an improvement of 25.74% vs. the prior art glass capillary. The results of Example 1 and Example 2 demonstrate that the resistive capillaries improved peak shapes in both fast polarity switching and non-switching applications.

All of the publications, patents and patent applications cited in this application are herein incorporated by reference in their entirety to the same extent as if the disclosure of each individual publication, patent application or patent was specifically and individually indicated to be incorporated by reference in its entirety.

A number of embodiments of the invention have been described. Nevertheless, it will be understood that various modifications may be made without departing from the spirit and scope of the invention.

The invention claimed is:

1. An ion source comprising:

an ion generator;

a capillary of an insulating or resistive material, the capillary having a front end and a rear end and a resistive inner surface, wherein the front end of the capillary is configured to receive ions from the ion generator; and a power supply applying a voltage potential to the front end of the capillary, wherein the polarity of the voltage potential alternates periodically.

2. The ion source of claim 1, wherein the voltage potential alternates at least two times per second.

3. The ion source of claim 1, wherein the voltage potential alternates at least four times per second.

4. The ion source of claim 1, wherein the ion generator is at a voltage potential of less than 1 kV.

5. The ion source of claim 1, wherein the ion generator is at ground potential.

6. The ion source of claim 1, wherein the capillary has a resistance in the range of about 100 MOhm to 10 GOhm.

7. The ion source of claim 1, wherein the capillary is a glass capillary with a resistive inner surface.

8. The ion source of claim 1, wherein the capillary is prepared by baking a metal oxide-enriched glass capillary in the presence of a reducing agent.

9. A mass spectrometer system comprising the ion source of claim 1.

10. The mass spectrometer system of claim 9, wherein the ion generator is selected from the group consisting of electrospray ionization (ESI), atmospheric pressure chemical ionization (APCI), atmospheric pressure photoionization (APPI), matrix assisted laser desorption ionization (MALDI), and any combination thereof.

11. The mass spectrometer system of claim 9, comprising a quadruple, time-of-flight, or ion trap mass analyzer.

12. The mass spectrometer system of claim 9 that is a tandem mass spectrometer system.

13. The mass spectrometer system of claim 9, further comprising a liquid chromatography separation device.

14. A method for transporting ions through a capillary in a polarity-switching electric field, comprising:

(a) providing:

a capillary of an insulating or resistive material, the capillary having a front end and a rear end and a resistive inner surface, wherein the pressure at the front end is higher than the pressure at the rear end; and a power supply applying a voltage potential to the front end of the capillary, wherein the polarity of the voltage potential alternates periodically; and (b) exposing the front end of the capillary to ions so that ions of the opposite polarity to the polarity of the voltage potential are attracted to the front end of the capillary.

15. The method of claim 14, wherein the capillary and power supply are part of a mass spectrometer system.

16. The ion source of claim 14, wherein the voltage potential alternates at least two times per second.

17. The ion source of claim 14, wherein the voltage potential alternates at least four times per second.

18. The ion source of claim 14, wherein the capillary is a glass capillary with a resistive inner surface.

19. The ion source of claim 14, wherein the capillary is prepared by baking a metal oxide-enriched glass capillary in the presence of a reducing agent.

20. An ion source comprising:

an ion generator;

a capillary of an insulating or resistive material, the capillary having a front end and a rear end and a resistive outer surface, wherein the front end of the capillary is configured to receive ions from the ion generator; and a power supply applying a voltage potential to the front end of the capillary, wherein the polarity of the voltage potential alternates periodically.

21. A mass spectrometer comprising the ion source of claim 20.

* * * * *